(12) United States Patent
Wang et al.

(10) Patent No.: US 7,227,684 B2
(45) Date of Patent: Jun. 5, 2007

(54) METHOD AND SYSTEM FOR PROVIDING BEAM POLARIZATION

(76) Inventors: Jian Wang, 5923 Derick Dr., Orefield, PA (US) 18069; Xuegong Deng, 87 Royal Dr., #430, Piscataway, NJ (US) 08854; Greg Blonder, 120 Woodland Ave., Summit, NJ (US) 07901; Erli Chen, 11 Day Lily Ct., Belle Mead, NJ (US) 08502

(*) Notice: Subject to any disclaimer, the term of this patent is extended or adjusted under 35 U.S.C. 154(b) by 0 days.

(21) Appl. No.: 10/644,643

(22) Filed: Aug. 20, 2003

(65) Prior Publication Data
US 2004/0201889 A1 Oct. 14, 2004

Related U.S. Application Data

(60) Provisional application No. 60/404,746, filed on Aug. 21, 2002.

(51) Int. Cl.
*G02B 27/28* (2006.01)
*G02B 5/30* (2006.01)

(52) U.S. Cl. .................. 359/486; 359/483; 359/485

(58) Field of Classification Search ............. 359/483, 359/486, 497, 500, 485; 427/163.1; 349/9; 353/20
See application file for complete search history.

(56) References Cited

U.S. PATENT DOCUMENTS 4,289,381 A * 9/1981 Garvin et al. ............ 427/163.1

6,122,103 A 9/2000 Perkins et al.
6,288,840 B1 * 9/2001 Perkins et al. ............... 359/486
6,844,971 B2 * 1/2005 Silverstein et al. ......... 359/486
2003/0007251 A1 * 1/2003 Imaizumi et al. ........... 359/584

FOREIGN PATENT DOCUMENTS

EP 1 158 319 A2 11/2001

* cited by examiner

*Primary Examiner*—Leonidas Boutsikaris
(74) *Attorney, Agent, or Firm*—Reed Smith LLP

(57) ABSTRACT

A radiation polarizer, controller, and a method of radiation polarization and beam control, are disclosed. The radiation polarizer includes a substrate, at least one anti-reflection coating layer communicatively coupled to the substrate, at least two nanostructures communicatively coupled to the at least one anti-reflection coating layer, and at least two groove layers, wherein each one of the at least two groove layers is interstitial to a respective one of the at least two nanostructures. The method may include the steps of communicatively coupling at least one anti-reflection coating layer to a substrate, communicatively coupling at least two nanostructures to at least one of the at least one anti-reflection coating layer, providing interstitially to a respective one of the at least two nanostructures at least two groove layers, coupling the at least two groove layers and the at least two nanostructures to provide a pass wavelength in the range of about 250 nm to less than about a microwave wavelength, and allowing for examining of radiation having a wavelength in a range of about 250 nm to less than about a microwave wavelength, and having an electric field orthogonal to the at least two groove layers, by allowing for a passing of the radiation through said coupling of the at least two groove layers and the at least two nanostructures.

30 Claims, 13 Drawing Sheets

METHOD AND SYSTEM FOR PROVIDING BEAM POLARIZATION

CROSS-REFERENCE TO RELATED APPLICATIONS

This application is related to U.S. Patent Applications Ser. No. 60/404,746 entitled "Multilayer Structures for Polarization and Beam Control," filed Aug. 21, 2002, which is hereby incorporated herein as if set forth herein in the entirety.

FIELD OF THE INVENTION

The present invention generally relates to methods and systems for broadband polarization beam combining and separation, polarizers, and polarization dependent multiplexing/demultiplexing. More particularly, the present invention relates to nanostructures employed to perform polarization beam combining or separation, polarizers, and polarization dependent multiplexing/demultiplexing.

BACKGROUND OF THE INVENTION

A light wave may be formed of electrical field vectors, i.e. peaks and troughs, radiating out in all directions from the direction of propagation of the light wave. A polarizer may be, in essence, a screen that allows only a narrow segment of the vectors to pass, namely those vectors that are oriented in a specific plane.

A polarizer may be used for beam splitting, combining, polarization, or like-functions, and may be formed of a series of extraordinarily thin conductive "ribbons", each running parallel to each other of the "ribbons". This is known as a wire-grid, or grating, polarizer. In an instance wherein radiation, such as visible or infrared light, strikes the wire-grid of the polarizer, some of that radiation is reflected, while that portion of the radiation that is selectively polarized by the wire grid may pass. Such a wire grid polarizer polarizes the radiation wave incident on the parallel conductors perpendicularly to the length of the conductors.

The grid, or grating, of a grid polarizer may be highly dense, due, in part, to the fact that the "ribbons" must be closer together than the wavelength of the radiation to be polarized, controlled, or analyzed. Thus, the smaller the wavelength of the radiation to be operated on is, the more dense the wire grid must be in order to operate on the subject radiation. This has been, as is known in the art, a limitation on the types of radiation that may be polarized using such a polarizer. For example, wire grid polarizers/beam splitters have historically been used in the microwave region, in which longer wavelengths make the construction more feasible.

The polarization of radiation may be used to control the radiation that is the subject of the polarization, such as in a splitter or combiner, and to analyze the polarization characteristics of an object, such as by examining the light reflected from, or by, an object. Polarization characteristics may provide for extraction of significant information about the physical and chemical makeup of an object and of a surface. A polarizing beam splitter may thus act as an analyzer, for example, reflecting unwanted light, and passing desired light.

Exemplary optical and electro-optical polarizer applications may include lasers, glare-reduction, lens coating, display enhancement, and exploitation of limited bandwidth availability, to name a few. For example, through "frequency reuse," an antenna may simultaneously transmit adjacent beams at the same frequency, and, by polarizing each beam differently, nonetheless maintain useful beam isolation.

In the fields of optics, telecommunications, optical and electro-optical applications and photonics, it may be highly desirable to enhance device performance and reduce fabrication, packaging and assembly costs, such as by providing polarization capabilities that provide improved performance through a broader range of radiation, but that can be fabricated at low cost. For example, it may be desirable to provide a improved photonic component, which may be incorporated into a Photonic Integrated Circuit (PIC), or with another photonic device.

Accordingly, it is desirable to provide a polarization controller, system, device, and method that employs nano-structures to perform polarization, thereby providing improved performance through a broader range of radiation wavelengths at a low fabrication cost.

SUMMARY OF THE INVENTION

The present invention may include a radiation polarizer. The radiation polarizer includes a substrate, at least one anti-reflection coating layer communicatively coupled to the substrate, at least two nanostructures communicatively coupled to the at least one anti-reflection coating layer, and at least two groove layers, wherein each one of the at least two groove layers is interstitial to a respective one of the at least two nanostructures. A communicative coupling between each one of said groove layers and the respective one of the nanostructures may polarize the radiation, wherein the radiation has an electric field orthogonal to the at least two groove layers, and wherein the radiation has a wavelength in a range of about 250 nm to less than about a microwave wavelength.

The present invention may also include a method for providing at least one of radiation polarizer and beam control. The method may include the steps of communicatively coupling at least one anti-reflection coating layer to a substrate, communicatively coupling at least two nanostructures to at least one of the at least one anti-reflection coating layer, providing interstitially to a respective one of the at least two nanostructures at least two groove layers, coupling the at least two groove layers and the at least two nanostructures to provide a pass wavelength in the range of about 250 nm to less than about a microwave wavelength, and allowing for examining of radiation having a wavelength in a range of about 250 nm to less than about a microwave wavelength, and having an electric field orthogonal to the at least two groove layers, by allowing for a passing of the radiation through said coupling of the at least two groove layers and the at least two nanostructures.

Thus, the present invention may provide a polarization controller, system, device, and method that employs sub-optical wavelength nano-structures to perform polarization, thereby providing improved performance through a broader range of radiation wavelengths at low fabrication cost.

BRIEF DESCRIPTION OF THE DRAWINGS

The invention will be better understood with reference to the following illustrative and non-limiting drawings, in which like references there-throughout designate like elements of the invention, and wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, many other elements found in a typical optical or electro-optical apparatus, system, and method. Those of ordinary skill in the art will recognize that other elements are desirable and/or required in order to implement the present invention. However, because such elements are well known in the art, and because they do not facilitate a better understanding of the present invention, a discussion of such elements is not provided herein.

Figure 1:
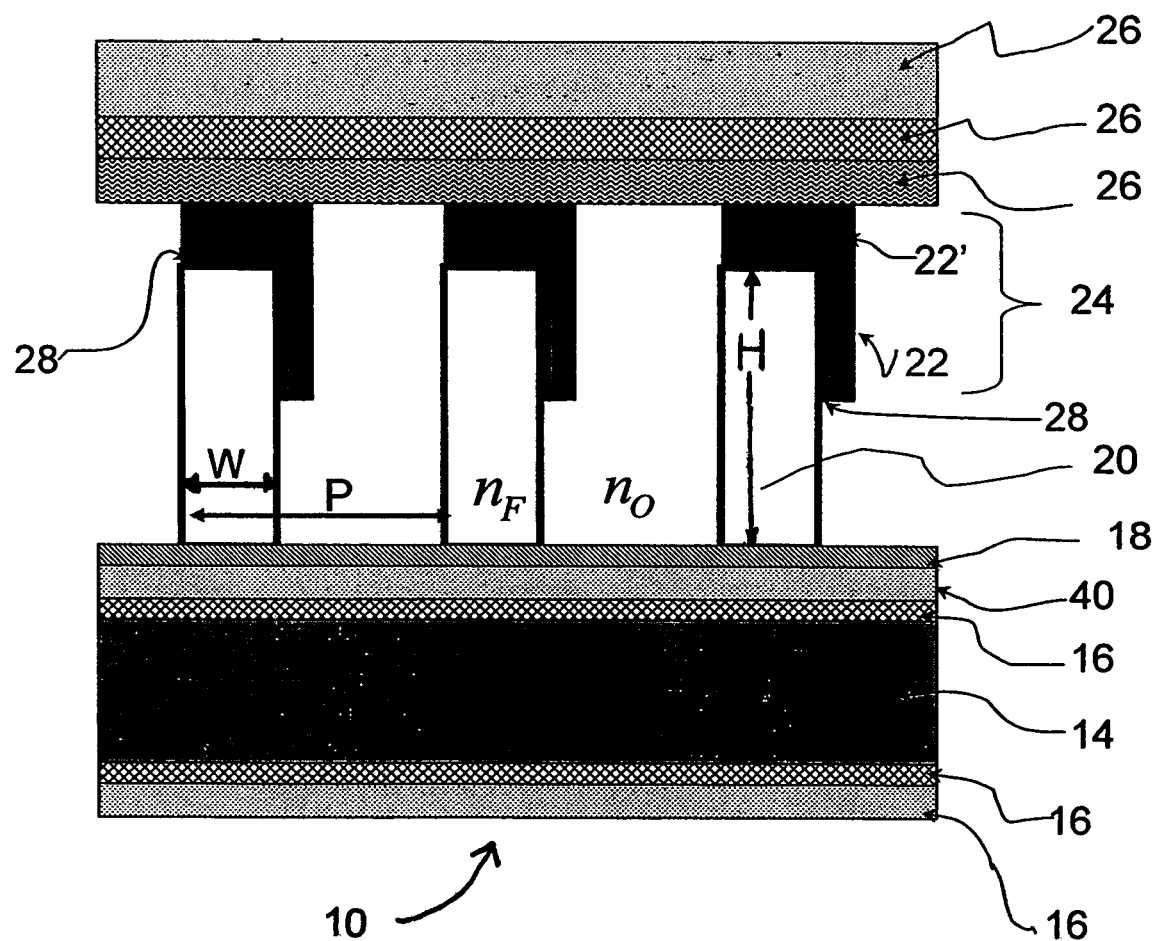
FIG. 1 shows a schematic diagram illustrating a polarizing beam combiner/beam splitter ("PBC/PBS")

FIG. 1 shows a schematic diagram illustrating a polarizing beam combiner/beam splitter ("PBC/PBS") 10. The PBC/PBS 10 may include, for example, a substrate 14 upon which is resident am anti-reflection coating (ARC) 16. Further, a second ARC 16 may be resident upon the substrate 14 below a residual layer 18. The structure may further include certain buffer layers, or stop layers, 40 to optimize performance. Nanostructures 20 and 24 including nanoelements or sub-wavelength elements 22, '22, may include multiple elements each of width W and height H. Width W may include widths from 10 to 500 nm and more specifically from 15 to 180 nm. Height H may include heights from 10 to 1000 nm, and more specifically from 30 to 500 nm.

Further, the dimensions of the elements may vary or be chirped as will be understood by those possessing an ordinary skill in the pertinent arts. Pattern of nanostructures 20 may have a period of nanoelements, P. This period may also be varied or chirped. As may be seen in FIG. 1, alternating refractive indices may be used. In FIG. 1, for example, a higher index material, having a refractive index $n_F$, may be positioned substantially adjacent to a lower index material, having a refractive index $n_O$, creating alternating regions of relatively high and low indices, respectfully. The filling ratio of pattern of nanostructures 20 and 24, denoted W/P, may be defined as the ratio of the width of the index area of the higher of the two refractive index elements within the period to the overall period. Filling ratio, W/P, may determine the operation wavelength of the device as defined by pattern of nanostructures 20 and 24, as would be evident to one possessing an ordinary skill in the pertinent arts. Higher index material may take the form of materials known to those possessing an ordinary skill in the pertinent arts, such as aluminum, gold, silver, copper, and alloys of these materials, by way of non-limiting example only. Lower index material may take the form of air, vacuum, or a dielectric material such as silicon dioxide, metal oxide, organic polymer containing hydrocarbon, or glass, by way of non-limiting example only. For completeness, there may be multiple materials each occupying a portion of overall period P.

As will be recognized by those possessing ordinary skill in the pertinent arts, various patterns may be replicated in such a manner onto or into substrate 14. Such patterns may take the form of strips, trenches, pillars, or holes, for example, all of which may have a common period or not, and may be of various heights and widths. Strips may take the form of rectangular grooves, for example, or alternatively triangular or semicircular grooves, by way of non-limiting example. Similarly pillars, basically the inverse of holes, may be patterned. Such pillars may be patterned with a common period in either axis or alternatively by varying the period in one or both axes. The pillars may be shaped in the form of, for example, elevated steps, rounded semi-circles, or triangles. The pillars may also be shaped with one conic in one axis and another conic in another, for example. Nanostructures may contact adhesion layer 28. Overcoat 26 for anti-reflection and protection may be resident upon the one or more nanostructure 20 or adhesion layer 28.

Figure 2:
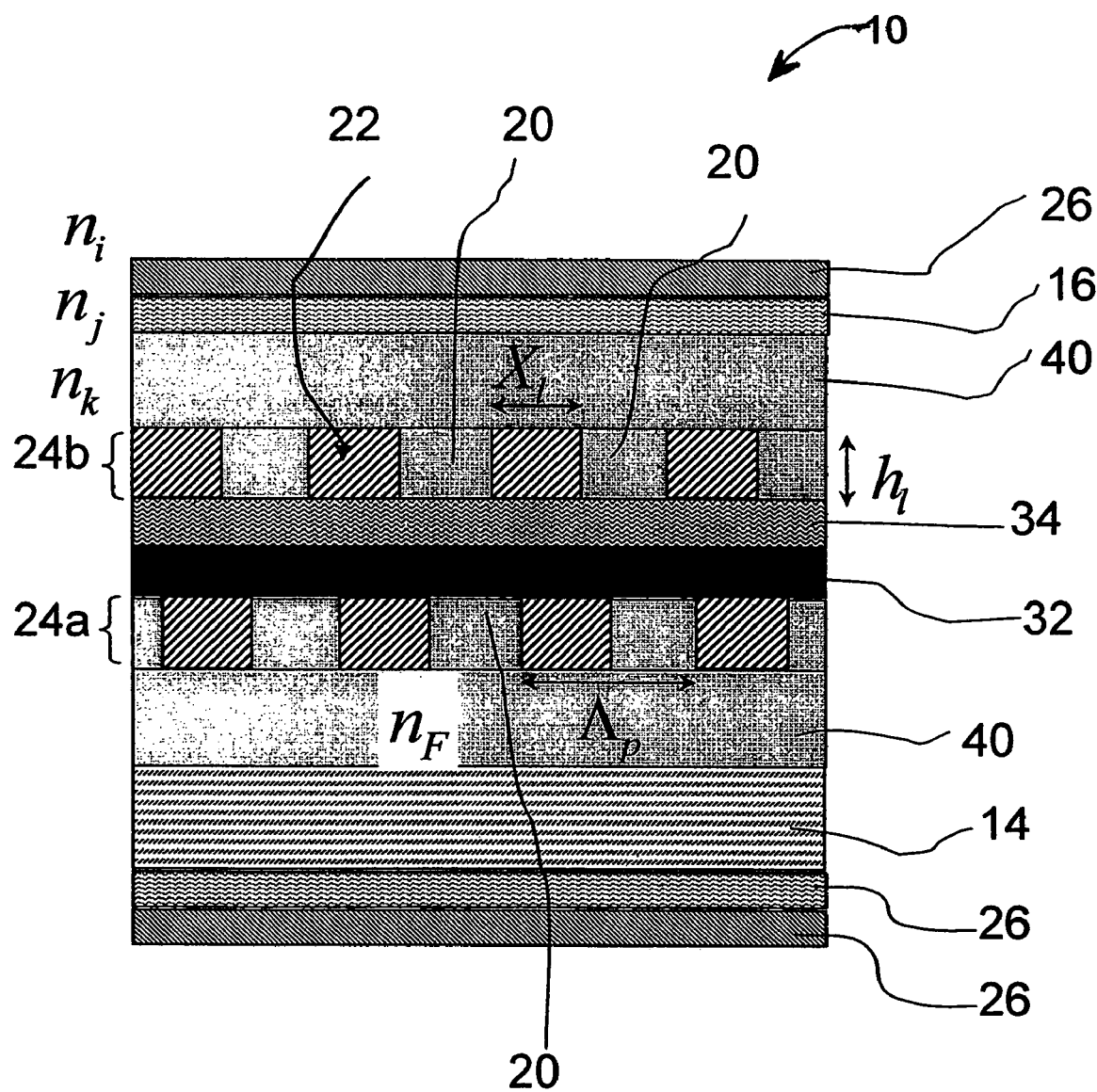
FIG. 2 shows a schematic diagram more specifically illustrating an embodiment of a PBC/PBS.

FIG. 2 shows a schematic diagram more specifically illustrating an embodiment of PBC/PBS 10. PBC/PBS 10 of FIG. 2 may include a plurality of nanostructures 22 including a plurality of grooves 20 among the nanostructures in a predetermined pattern, and at least one substrate 14. PBC/PBS 10 of FIG. 2 may also include buffer layers, or etch stop layers, 32, 34 and 40, ARC layers 16, spacer layers 32, and overcoat/protective layers 26, such as to reinforce the structures of the present invention, to protect the layers of the present invention, and to obtain proper reflections in the present invention. The present invention may provide a coupling of ARC layers and nanostructures to optimize performance and globally optimize the structures of the present invention.

PBC/PBS 10 of FIG. 2 may be formed, for example, by placing nanoelements 22 upon, or between, grooves 20, such as a substrate, having lower conductivity than the nanostructures. For example, two or more layers of nanostructures 24a, 24b, such as in the form of metal grids, may be at least partially surrounded by air, or any dielectric. Thereby, the present invention may provide, for example, the partial or complete immersion of nanostructures into dielectric media, such as for polarization control and beam routing. By the use of one or more layers of nanostructures 24a, 24b, a transmitted wave may be polarized, in multiple layers, with the electric field orthogonal to the nanostructures. Thereby, a broad angular bandwidth, and broad spectral bandwidth, such as for visible, near-infrared, or infrared radiation of wavelength greater than, for example, about 250 nm, may be provided.

Nanostructures 22 may have, for example, a length, X1, a height from the base layer on which the nanostructure is formed, h1, and a run along the base layer on which the nanostructure is formed. Nanostructure 22 may be any structure suitable for polarization, such as, but not limited to, a wire, or grating, formed along the substrate, a pillar rising from the substrate, or a series of one or more rising shapes located interstitially on the substrate among the grooves in a predetermined pattern. In an embodiment of the present invention, each nanostructure 22 may be parallel to each other of nanostructures 22. In an embodiment of the present invention, each nanostructure 22 may be in a substantially non-parallel predetermined pattern with respect to each other of nanostructures 22. Nanostructures 22 may be formed of, for example, a conductor, such as a metal, a dielectric, such as Si, or other suitable material. Nanostructures 22 may have an index of refraction, $n_M$, and an effective index of refraction $n'_M = n_M + i \times k_M, i = \sqrt{-1}$.

Grooves 20 may be formed between or among nanostructures 22 in a predetermined pattern suitable for performing the desired polarization and control. Grooves 20 may have resident therein materials, or combinations of materials, such as air or other dielectrics, for example, which may be of lower conductivity than nanostructures 22 to which each groove 20 is adjacent. Pattern of nanostructures 20 may have a period of nanoelements, P. This period may also be varied or chirped. As may be seen in FIG. 1, alternating refractive indices may be used. In FIG. 1, for example, a higher index material, having a refractive index $n_F$, may be positioned substantially adjacent to a lower index material, having a refractive index $n_O$, creating an alternating regions of relatively high and low indices, respectfully. The filling ratio of pattern of nanostructures 20, denoted W/P, may be defined as the ratio of the width of the index area of the higher of the two refractive index elements within the period to the overall period. Filling ratio, W/P, may determine the operation wavelength of the device as defined by pattern of nanostructures 20, as would be evident to one possessing an ordinary skill in the pertinent arts. Further, in an embodiment of the present invention, the material(s) within each groove 20 may have a different index of refraction than the index of refraction of adjacent ones of nanostructures 22, and thereby the material in the groove, and the filling ratio thereof, are controlling factors in the operable wavelength of the groove/nanostructure combination. As shown in FIG. 2, the period of the operation of the present invention is a function of the length, X1, of one of nanostructures 22, and the length of a corresponded one of grooves 20. Grooves 20 may additionally serve as spacers or buffers, for example.

At least one substrate 14 may provide the base on which an apparatus of the present invention is constructed. Substrate 14 may be any substrate suitable for building the structures of the present invention thereupon, as will be apparent to those skilled in the art.

In an embodiment illustrated in FIG. 2, two layers of nanostructures and grooves 24a, 24b, herein termed "functional layers", may be provided upon substrate 14. As will be apparent to those skilled in the art in light of the disclosure herein, multiple functional layers 24a, 24b may be built one atop the other in the present invention, and each functional layer may have a predetermined nanostructure/groove pattern therein, which predetermined pattern may be correspondent to one or more patterns in one or more other of the functional layers, to achieve the designed operation of the device. A first of these functional layers 24a may be separated from the substrate by, for example, one or more ARC layers, one or more buffer layers, and one or more etch stop layers 40. The first of the functional layers 24a may be separated from the second of the functional layers 24b by one or more spacer, buffer, and etch stop layers, for example. Etch stop layers 40, as used in the present invention, may provide protection of the functional layers, and may additionally provide increased controllability of the formation of the nanostructures built upon the layers of the present invention. As will be evident to those skilled in the art, ones of the grooves may be filled prior to building of an additional layer, such as a spacer layer or etch stop layer, upon a particular functional layer.

In an embodiment of the device of FIG. 2, nanostructures 22 may be, for example, of length X1 equivalent to about 30 nm, and of height h1 in the range of about 50 nm to about 250 nm. More specifically, the height of each of the multiple layers may be less than about 250 nm. In an embodiment wherein multiple functional layers are built, the height of each of the functional layers may be decreased to allow for the presence of multiple layers. The height may be consistent within each different one of the multiple layers, or may vary as between ones of the multiple layers. Lengths and heights, such as those provided in the exemplary embodiments herein, may provide significantly reduced depth with respect to previously known PBC/PBSs. For example, a depth in the present invention may be in the range of about 50 nm to about 500 nm. In such an exemplary embodiment, the width of nanostructures 22 may be in the range of, for example, about 5 nm to about 50 nm for a period in the range of, for example, about 100 nm to about 300 nm.

A polarizer 10 as illustrated in FIG. 2 may have an exemplary transmissivity of greater than about 97%, and an extinction ratio of more than about 40 dB. Further, for example, a PBS in accordance with FIG. 2 may provide 180° of effective polarization separation in the space of about 0.2 mm or less, with greater than about 97% transmissivity. Additionally, for example, a PBC in accordance with FIG. 2 may have about 0.1 dB loss.

Devices 10, such as that of FIG. 2, in accordance with the present invention may exhibit a wide acceptance angle of up to about +/−20°, and a high damage threshold. Such devices may have, for example, thicknesses in the range of about 0.2, 0.5, or 1.0 mm, and dimensions in the range of about 1.0 $mm^2$ to 1000 $mm^2$. Such devices may be used for applications in fiber amplifiers, isolators, circulators, optical switches, electro-optics, and general optical processing applications, for example, wherein polarization is necessitated. Polarization optics may be fundamental in the system design of displays, such as liquid crystal displays, for example, wherein polarization is key in color consistency and flux efficiency.

Nanostructures 20 may be grown or deposited on substrate 14. Nanostructures 20 may be formed into or onto substrate 14 using any suitable replicating process, such as a lithographic process. For example, nanoimprint lithography consistent with that disclosed in U.S. Pat. No. 5,772,905, entitled NANOIMPRINT LITHOGRAPHY, the entire disclosure of which is hereby incorporated by reference as if being set forth in its entirety herein, may be effectively used. Therein is taught a lithographic method for creating nanostructures patterned in a thin film coated on a surface. For purposes of completeness and in summary only, a mold having at least one protruding feature may be pressed into a thin film applied to substrate. The at least one protruding feature in the mold creates at least one corresponding recess in the thin film. After replicating, the mold may be removed from the film, and the thin film processed such that the thin film in the at least one recess may be removed, thereby exposing a mask that may be used to create an underlying pattern or set of devices. Thus, the patterns in the mold are replicated in the thin film, and then the patterns replicated into the thin film are transferred into the substrate using a method known to those possessing an ordinary skill in the pertinent arts, such as reactive ion etching (RIE) or plasma etching, for example. Of course, any suitable method for forming a suitable structure into or onto an operable surface of substrate, for example, may be utilized though, such as photolithography, holographic lithography, e-beam lithography, by way of non-limiting example only. Substrate may take the form of silicon dioxide while a thin film of silicon forms pattern of nanostructures, for example.

According to an aspect of the present invention, an underlying one-dimensional (1-D) pattern of nanostructures, preferably formed of materials of high contrast refractive index, having high and low refractive index areas with distinct differences in refractive index, may be so formed on substrate. According to an aspect of the present invention, two-dimensional (2-D) pattern of nanostructures, preferably formed of materials of high contrast refractive index may be so formed on substrate.

Figure 3:
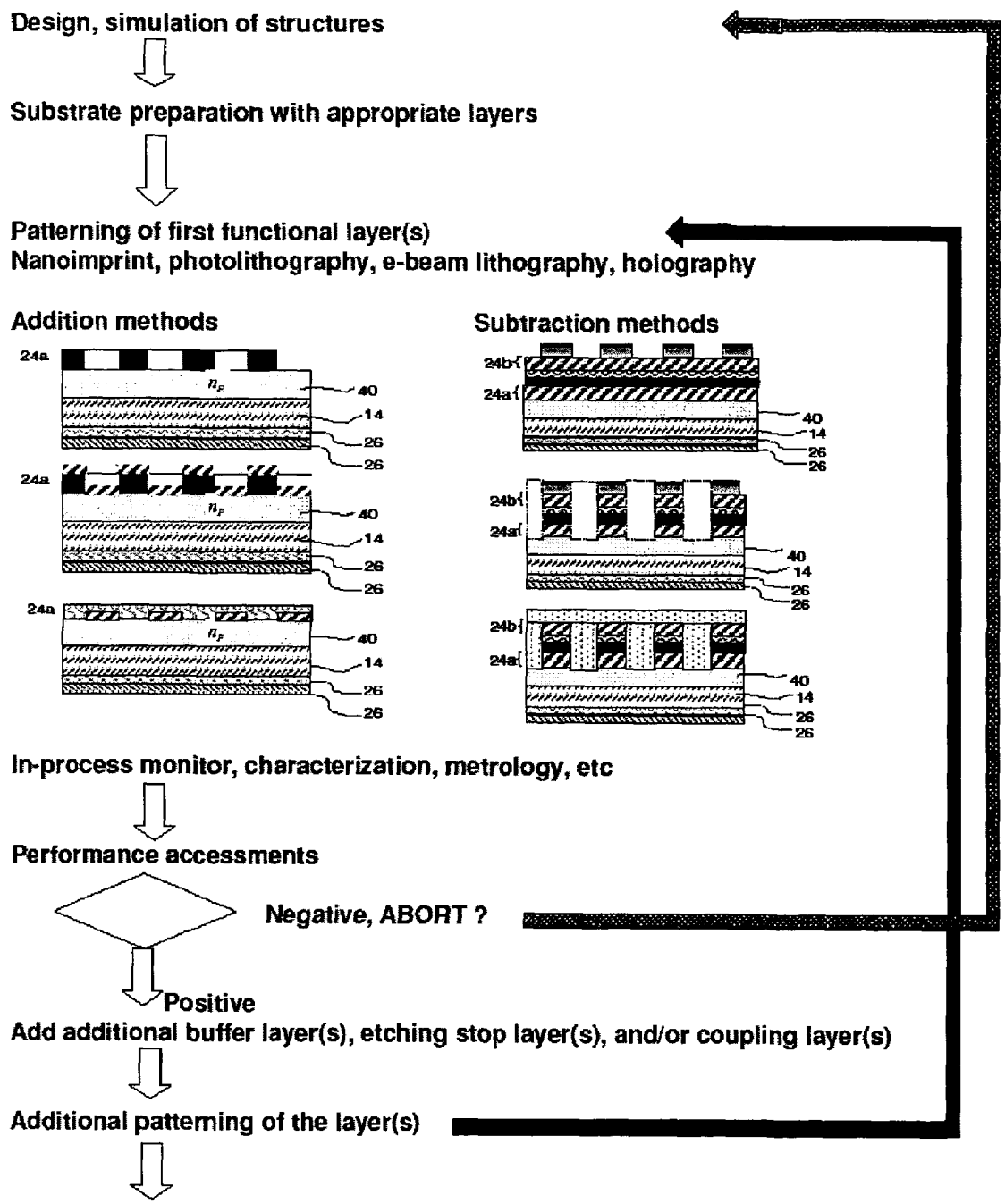
FIG. 3 shows a flow diagram illustrating a method of forming an embodiment of the present invention.

As will be recognized by those possessing ordinary skill in the pertinent arts, various patterns may be replicated into the devices by use of the teachings of FIG. 3. These patterns may serve various optical, electro-optical, and photonic functions. Such patterns may take the form of holes, strips, trenches or pillars, for example, all of which may have a common period, or not, and each of which may vary in height and width. For example, in a polarizer embodiment of the present invention, the nanostructure may be rectangular, trapezoidal, oval, convex hulls, or shapes onto which any points on a line connecting any two boundary points of nanostructure within the boundary.

The patterns of nanostructures may be of the form of rectangles, for example, or alternatively triangles or semi-circles. Similarly, pillars, basically the inverse of holes, may be patterned as nanostructures. The pillars may be patterned with a common period in both axes, or alternatively by varying the period in one or both axes. The pillars may be shaped in the form of, for example, elevated steps, rounded semi-circles, or triangles. The pillars may also be shaped with one conic in one axis and another conic in the other.

Accordingly, the nanostructures patterned onto the device may function as virtually any optical element which may be achieved with an applied pattern, such as, for example, a polarizer, polarizing beam splitter and combiner, narrow-band filter, artificial birefringent waveplate, broadband polarizing reflector, lens, or tunable filter.

An illustrative use of these nanostructures is polarization management, such as in a polarizer or PBC/PBS, as taught hereinthroughout. The nanostructures may be patterned as a grid or grating type device, for example. As is known in the pertinent arts, a grid structure transmits radiation with an E vector vibrating perpendicular to the grid or grating lines, and reflects the parallel radiation, assuming the wavelength of the radiation is much larger than the grid spacing. Because the current process is capable of forming nanostructures, which are small as compared to wavelengths, polarization management, such as polarization-selective beam control and routing, may be achieved. For example, in the case wherein a device takes the form of a laser, and the replicated pattern corresponds to a polarizer, and the surface replicated upon is a facet of the laser, and the polarizer has a high reflectivity at the laser wavelength, a laser may be realized that lases in a single polarization.

Another illustrative use of nanostructures is for wavelength management, for example as a narrow-band filter or tunable filter. The nanostructures may take the form of a grid, for example. The functionality of a filter utilizing such a grid spacing is known in the pertinent arts. The resonance effect may be used, and the thickness, the wavelength, and the angle of incidence may be varied to achieve desired results, for example. In an exemplary embodiment, energy efficient filters may be produced that are designed to admit only forward and backward propagating zero-order waves, for example. At resonance, the diffraction efficiency of the forward propagating zero order wave approaches zero, and the diffraction efficiency of the backward propagating wave approaches one. By following this principle, a filter with high efficiency, narrow bandwidth, and small size may be applied to another photonic device, for example.

Figure 4:
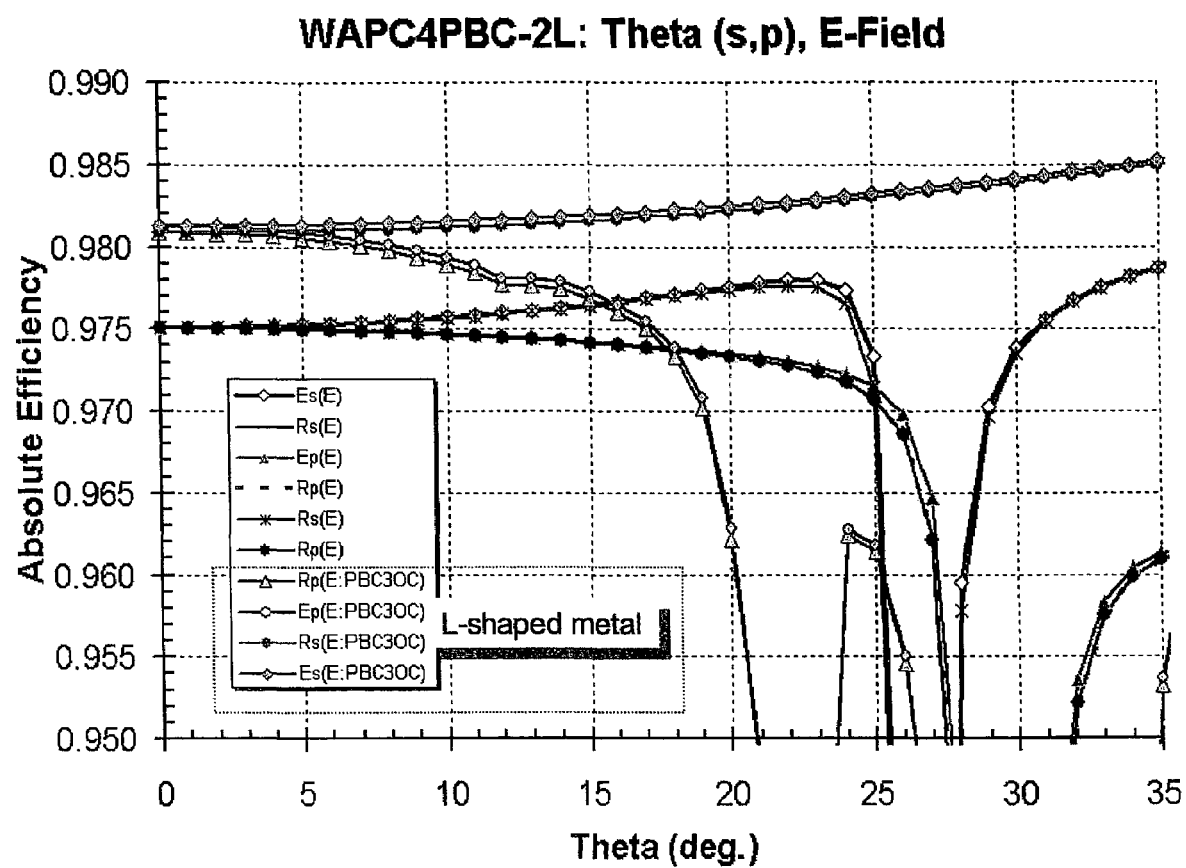
FIG. 4 shows a chart illustrating the performance of a multiple functional layer structure in accordance with the present invention.

FIG. 4 shows a chart illustrating the performance of a multiple functional layer structure in accordance with the present invention, as embodied in FIGS. 2 and 3, for example, for a PBC/PBS embodiment. The illustrated embodiment includes two functional layers. Shown are the angular reflections of fields having the major electromagnetic component polarized along the nanostructure, such as wire grids. Both s- and p-polarization (as related to transmitted electrical, TE, and transmitted magnetic, TM, fields) reflections are shown.

Figure 5:
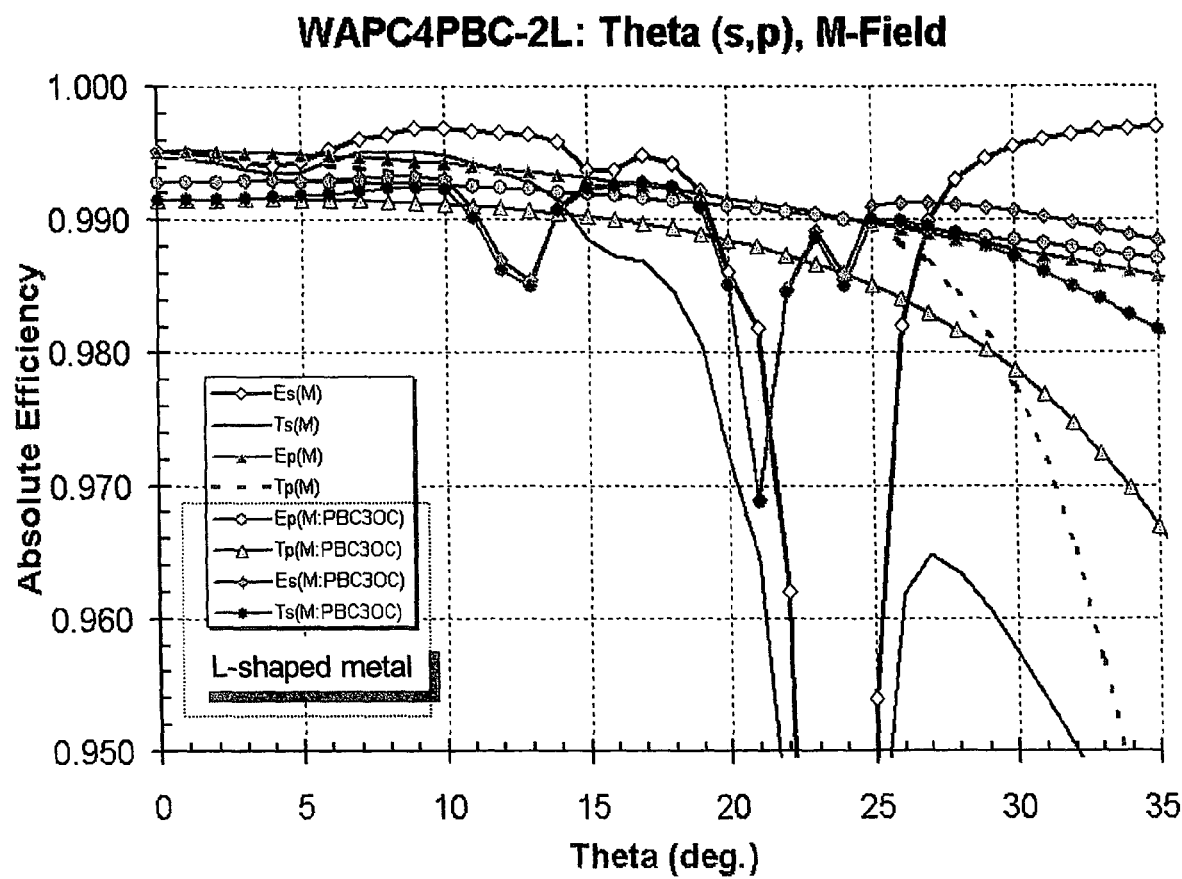
FIG. 5 shows a chart illustrating the performance of a multiple functional layer structure in accordance with the present invention.

FIG. 5 shows a chart illustrating the performance of a multiple functional layer structure in accordance with the present invention for a PBC/PBS embodiment. The illustrated embodiment includes two functional layers. Shown are the angular reflections of fields having the major electromagnetic component polarized orthogonal to the nanostructure, such as wire grids. Both s- and p-polarization reflections are shown.

Figure 6:
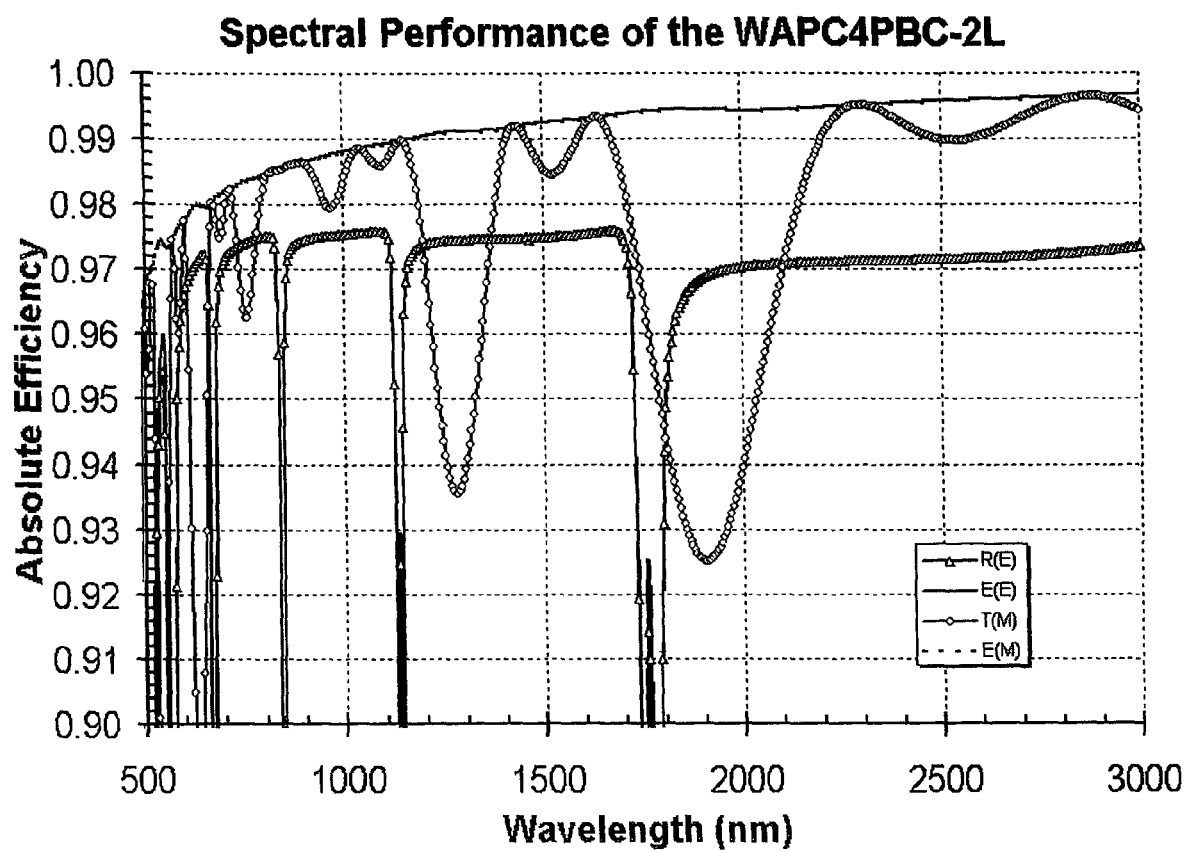
FIG. 6 shows a chart illustrating the performance of a multiple functional layer structure in accordance with the present invention.

FIG. 6 shows a chart illustrating the performance of a multiple functional layer structure in accordance with the present invention, for a PBC/PBS embodiment. The illustrated embodiment includes two functional layers. Shown are the spectral reflections of TE fields, and the transmission of TM fields, with respect to the nanostructure, such as wire grids. Different band structures due to the multilayering are evident in FIG. 6.

Figure 7:
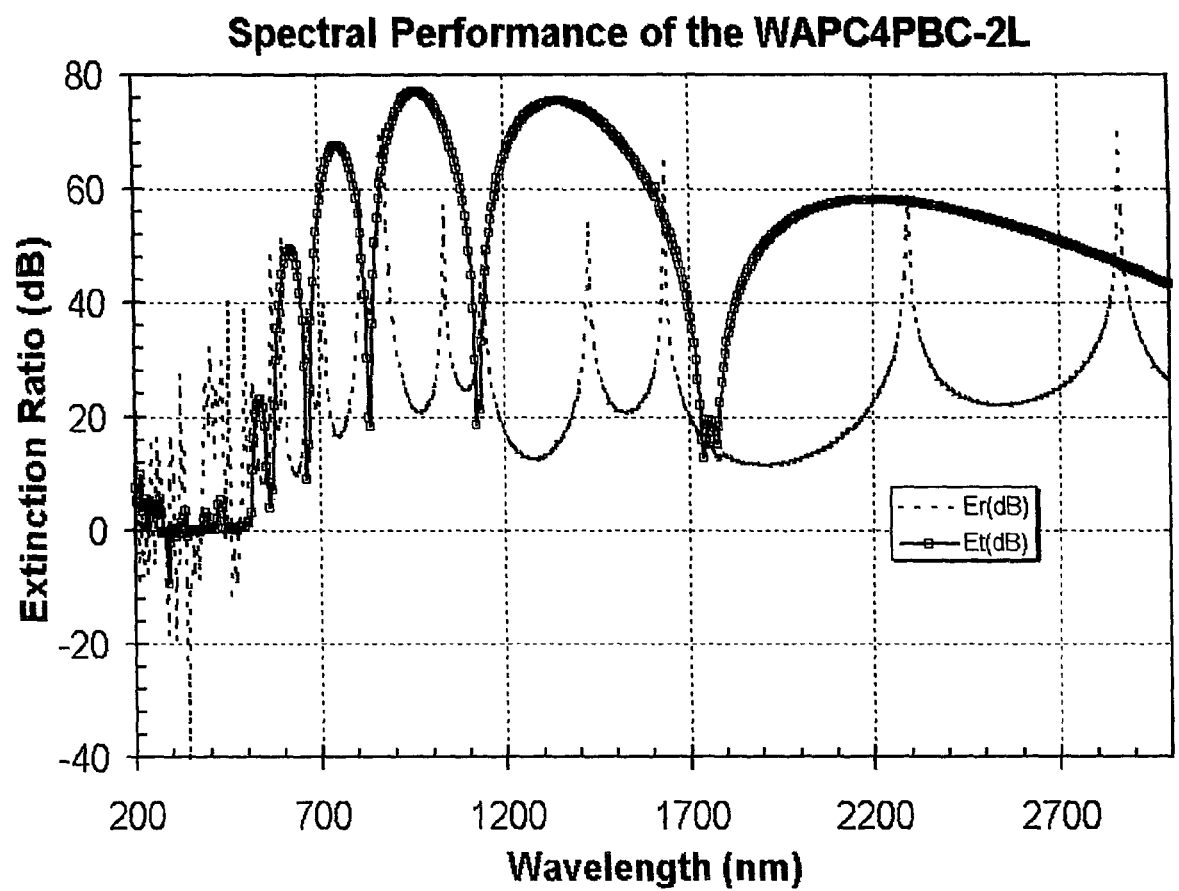
FIG. 7 shows a chart illustrating the performance of a multiple functional layer structure in accordance with the present invention.

FIG. 7 shows a chart illustrating the performance of a multiple functional layer structure in accordance with the present invention, for a PBC/PBS embodiment. Shown are spectral extinction ratios of reflections of TM fields and transmission of TE fields, with respect to the nanostructure, such as wire grids. Different band structures due to the multilayering are evident in FIG. 7. The reflection extinction ratio of the embodiment of FIG. 7 might be further improved by employing a multilayer ARC, as will be apparent to those skilled in the art based on the disclosure herein.

Figure 8A:
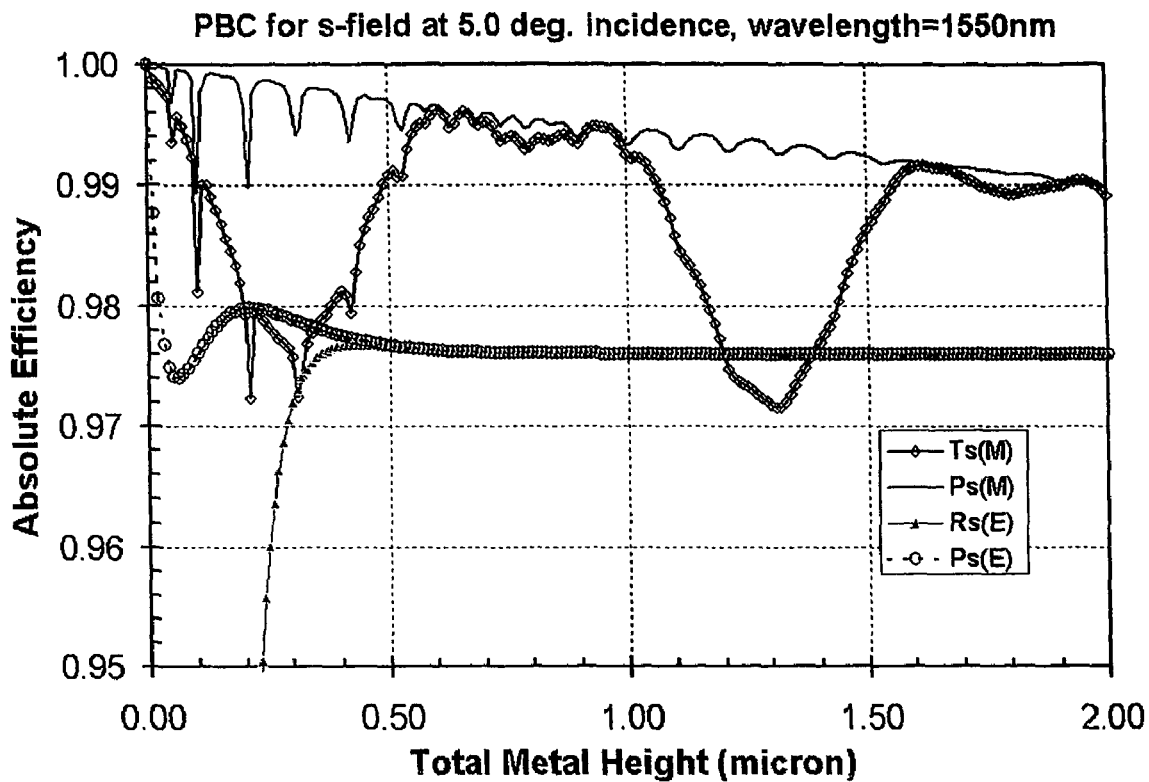
FIGS. 8A, B, and C show charts illustrating the absolute efficiency of the present invention for s-field polarization at 1550 nm wavelength, upon the condition that incident angle is 5.0 degrees.
Figure 8B:
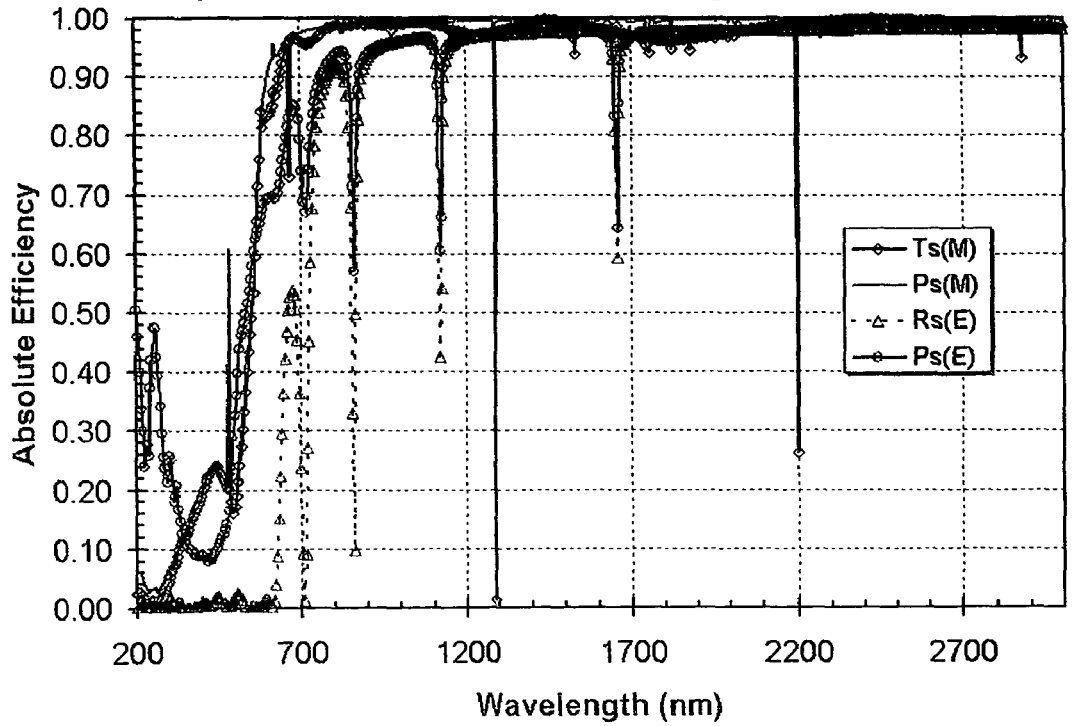
Figure 8C:
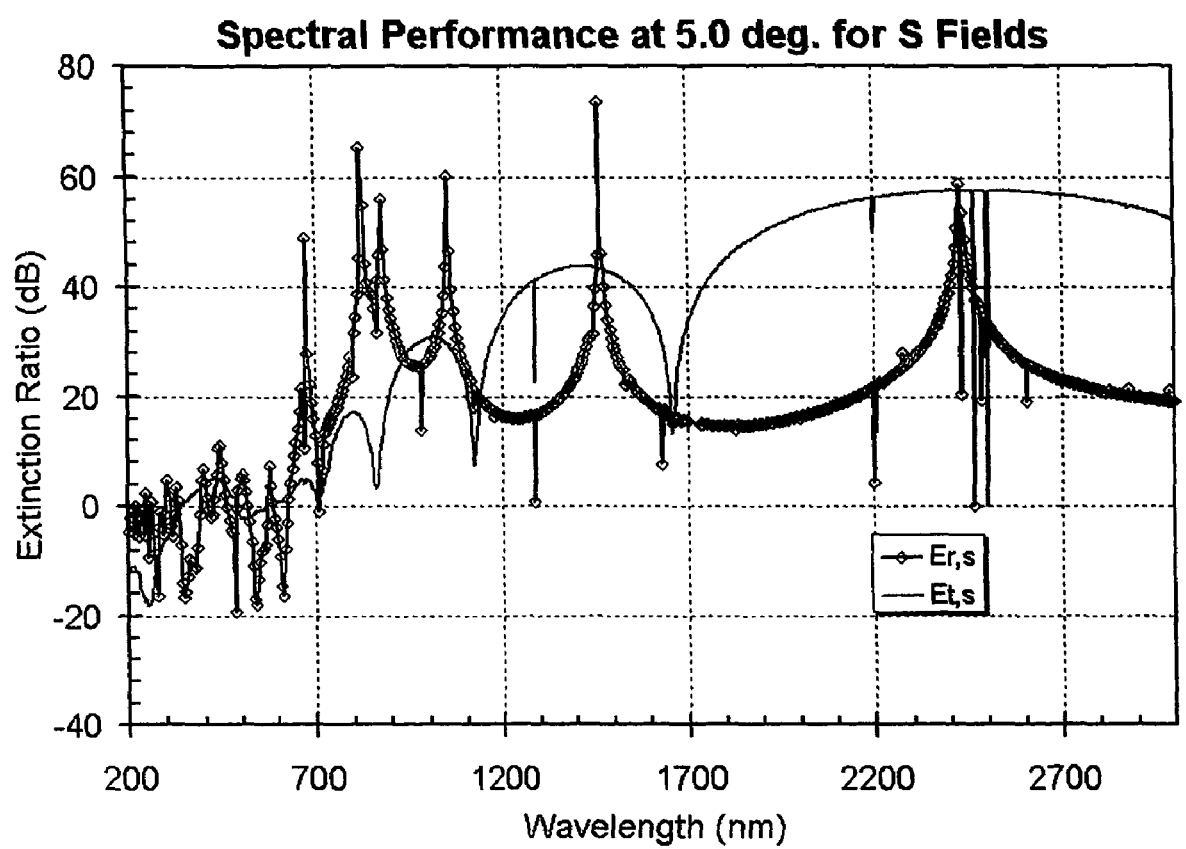

FIGS. 8A, B, and C show charts illustrating the absolute efficiency of the present invention for an s-field at 1550 nm wavelength, upon the condition that incident angle is 5.0 degrees. The materials used in the illustrative embodiment of FIGS. 8A, B, and C for the nanostructures are silica and gold.

Figure 9A:
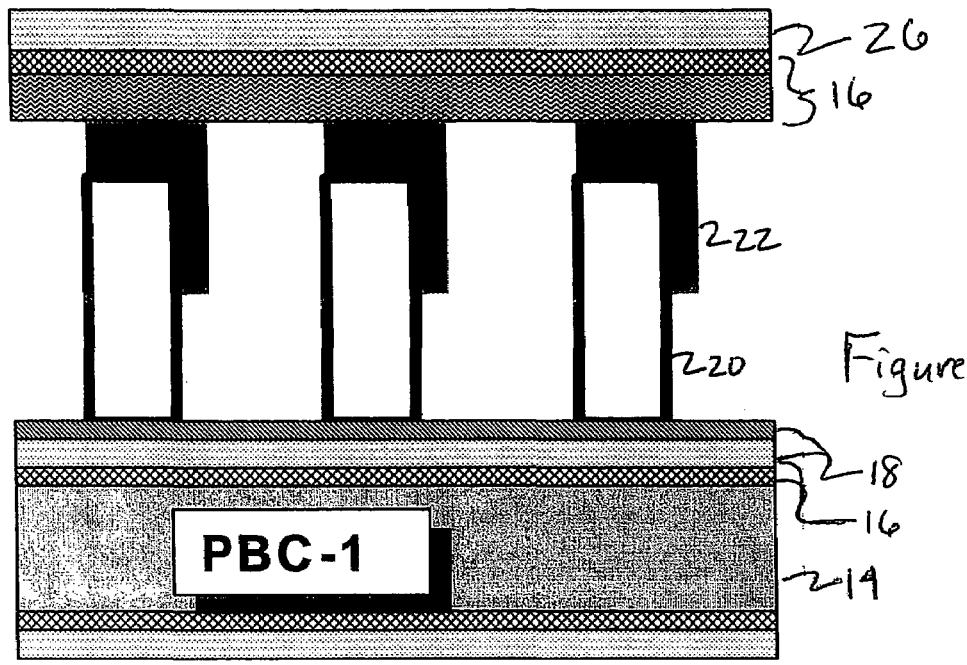
FIGS. 9A, B, C, and D show varied exemplary embodiments of the PBC/PBS structure of FIG. 1.
Figure 9B:
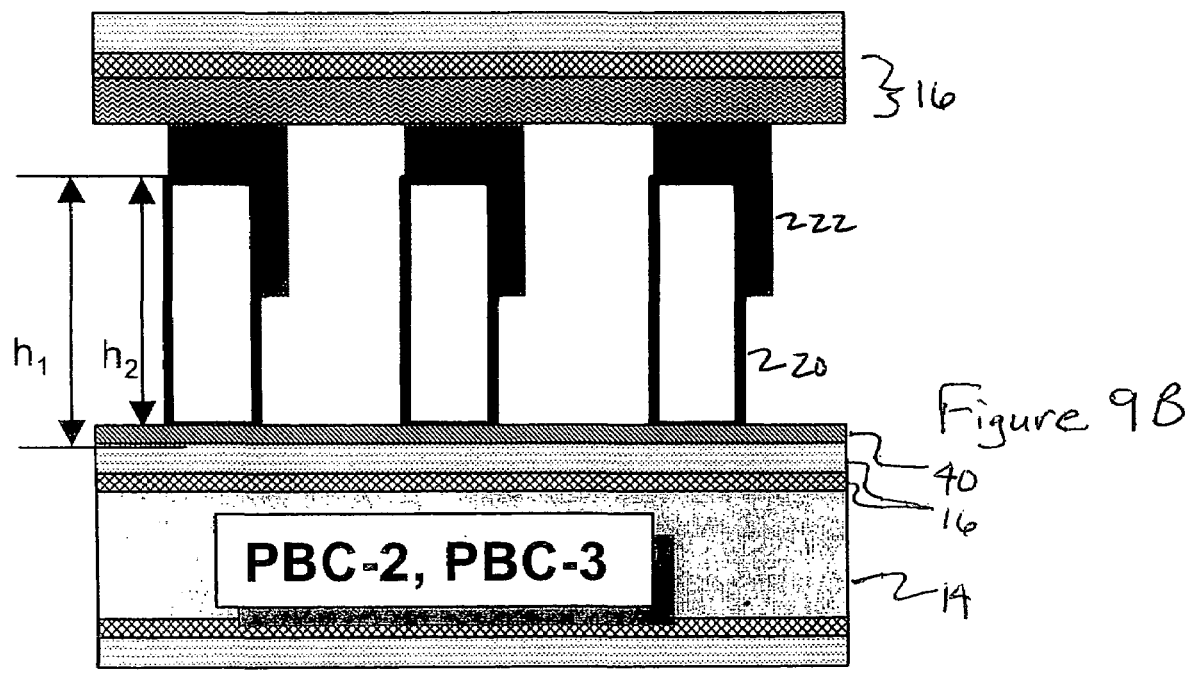
Figure 9C:
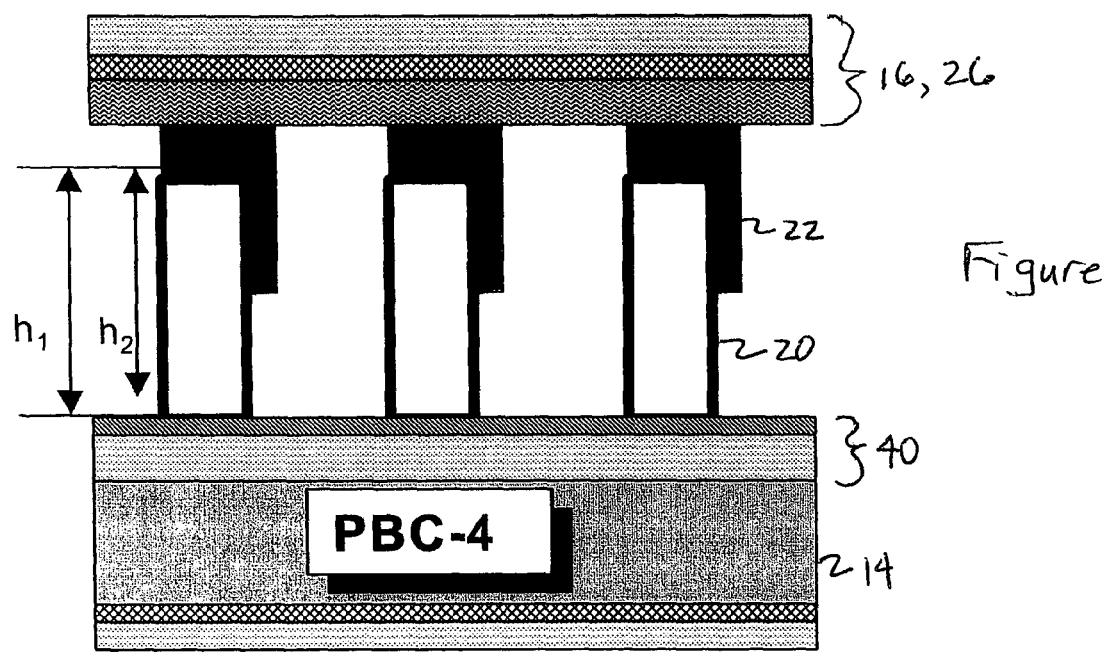
Figure 9D:
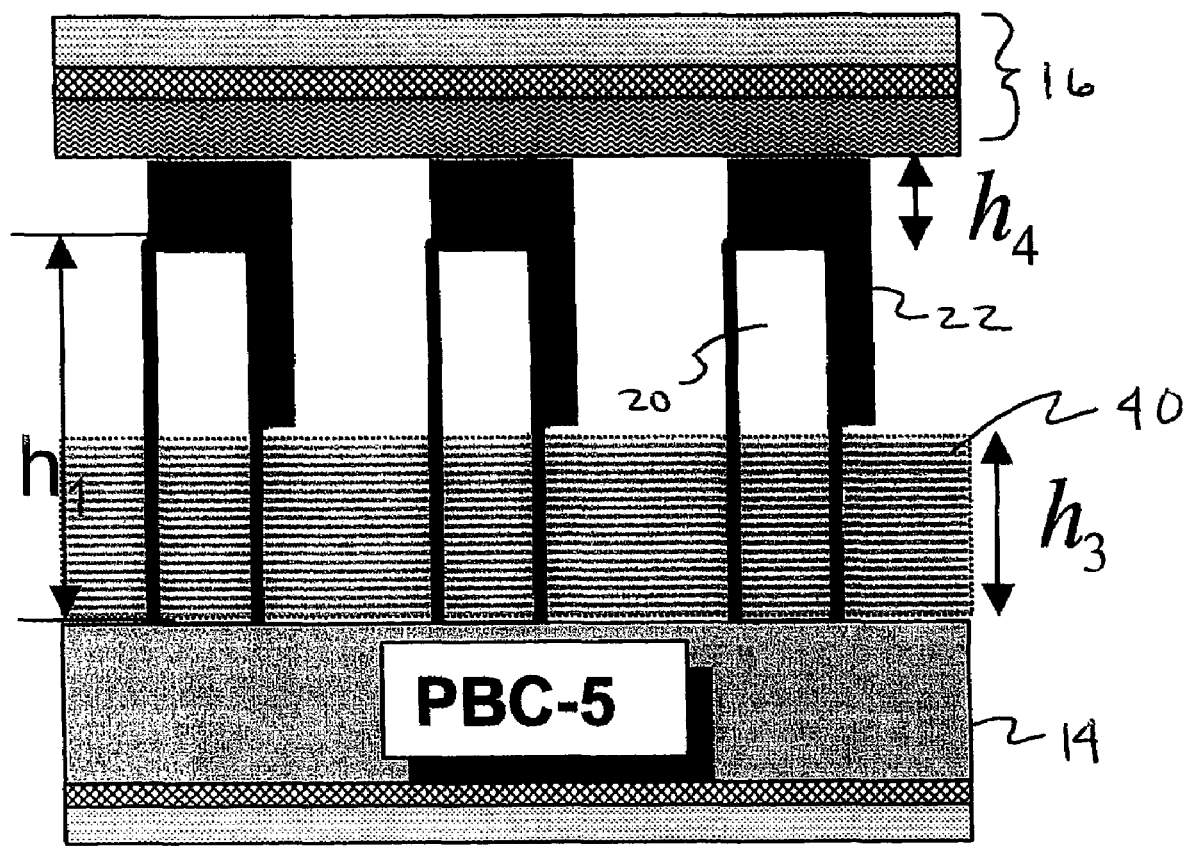

FIGS. 9A, B, C, and D illustrate varied exemplary embodiments of the PBC/PBS structure of FIG. 1. Referring now to FIG. 9A, for PBC-1, the base structure of FIG. 1 may be modified to include, or not include, overcoat 26, and the residual layer "(R)" 18 may extend into the top of an ARC-2 layer(s), for example. Referring now to FIG. 9B, for PBC-2/PBC-3, the structure of FIG. 1 may be modified with an added etching stop layer(s) 40, such as $HfO_2$ or $Al_2O_3$. ARC layer(s) 16, ARC 2, may be varied from ARC layer ARC 1. The device of FIGS. 9A and 9B may be optimized by a coupling of the functional nanostructures with the ARC 2 and the overcoat/ARC3 layers. Referring now to FIG. 9C, for PBC-4, the base structure of FIG. 1 may be modified by using a buffer layer and an etch stop layer 40, rather than an ARC 2 layer.

Figure 10:
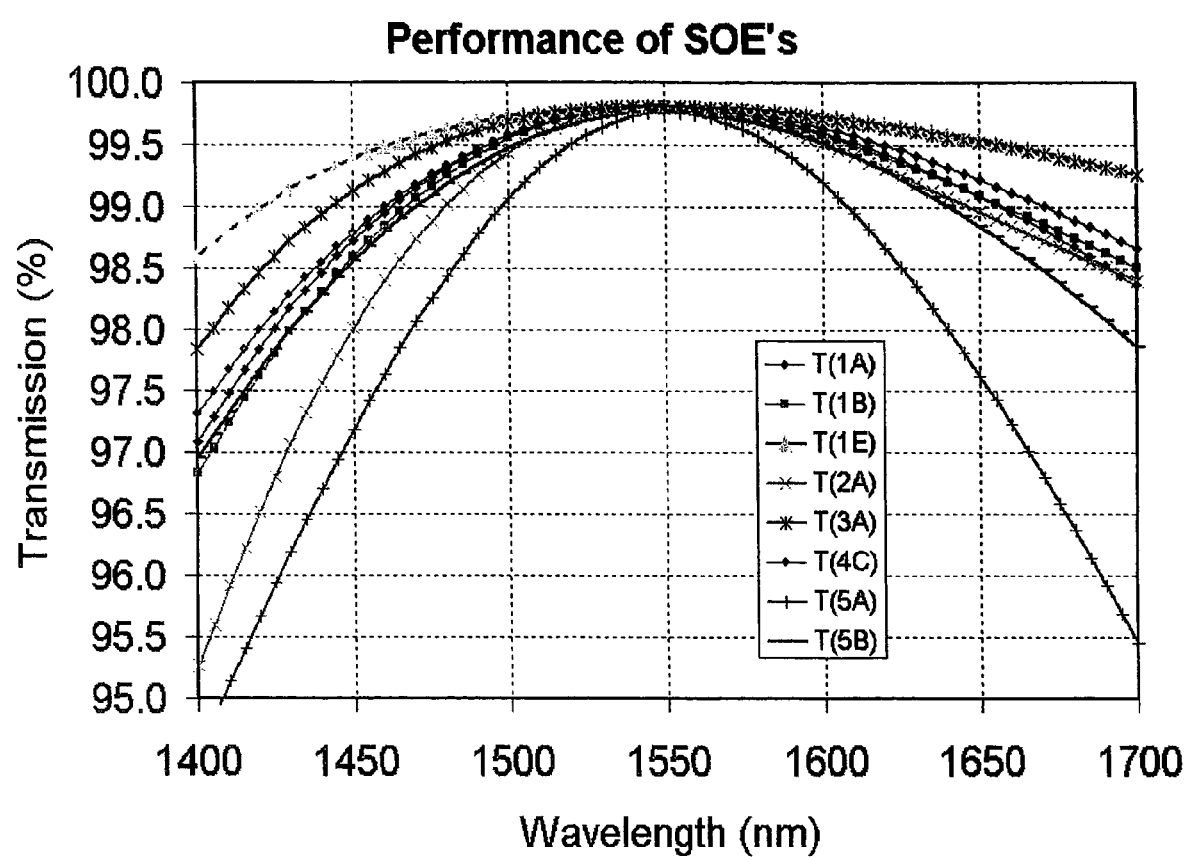
FIG. 10 shows a chart illustrating a performance comparison of the transmission spectra of TM field for some of the exemplary structures of FIG. 9.

FIG. 10 shows a chart illustrating a performance comparison of the transmission spectra of TM field for some of the exemplary structures of FIG. 9. Referring now to FIG. 10, "T(xY)" stands for the transmission of TM fields of one specific variation "Y", for PBC-x (x=1,2,3,4,5) in FIG. 9.

The device and method of the present invention may be incorporated into one or more optical devices, to, for example, improve the performance, and to lower fabrication costs, thereof. Such devices may include, for example, monolithic devices, such as monolithic laser devices, such as monolithic tunable laser devices, for example. Other devices in which the present invention is suitable for use will be apparent to those skilled in the art in light of the disclosure herein.

Those of ordinary skill in the art will recognize that many modifications and variations of the present invention may be implemented without departing from the spirit or scope of the invention. Thus, it is intended that the present invention cover the modification and variations of this invention, provided that those modifications and variations come within the scope of the appended claims and the equivalents thereof.

What is claimed is:

1. A radiation polarizer for maximizing a transmission of a first polarization state while minimizing a reflection of the first polarization state, and for minimizing a transmission for an orthogonal second polarization state while maximizing a reflection of the second polarization state, said polarizer comprising:
   a substrate;
   at least one anti-reflection coating layer communicatively coupled to said substrate; and
   at least two nanostructures communicatively coupled to said at least one anti-reflection coating layer thereby forming a layer of nanostructures;
   said at least two nanostructures each including a metallic and dielectric combination, said metallic and dielectric of said combination being located adjacent each other, said metallic having a short surface and a long surface, said dielectric extending only partially along said long surface of said metallic;
   wherein said nanostructure layer polarises the radiation, and wherein the radiation has a wavelength in a range of about 250 nm to less than 30 microns.

2. The radiation polarizer of claim 1, further comprising at least one protective layer formed atop said at least one substrate, said at least one anti-reflective coating, and said layer of nanostructures.

3. The radiation polarizer of claim 1, further comprising at least one protective layer formed beneath said at least one substrate, said at least one anti-reflective coating, and said layer of nanostructures.

4. The radiation polarizer of claim 1, wherein each of said nanostructures of said layer of nanostructures includes a dielectric having a lower conductivity than said metallic of said nanostructures.

5. The radiation polarizer of claim 1, wherein the dielectric is partially composed of a non-air dielectric.

6. The radiation polarizer of claim 1, wherein each of the nanostructures comprises at least one selected from the group consisting of a plurality of gratings, a plurality of pillars, and a plurality of rising shapes.

7. The radiation polarizer of claim 6, wherein each of said nanostructures may be substantially parallel to each other of said nanostructures.

8. The radiation polarizer of claim 1, further comprising at least one etch stop layer that separates at least one of said at least two nanostructures from said substrate.

9. The radiation polarizer of claim 1, wherein a first of said nanostructures is separated from a second of said nanostructures by at least one selected from the group consisting of air, vacuum and dielectric material.

10. The radiation polarizer of claim 1, wherein each metallic of each nanostructure comprises a height in a range of about 50 nm to about 250 nm.

11. The radiation polarizer of claim 1, wherein each metallic of each nanostructure comprises a width of about 30 nm.

12. The radiation polarizer of claim 1, wherein said nanostructures comprise a transmissivity of greater than about 97%, and an extinction ratio of greater than about 40 dB.

13. The radiation polarizer of claim 1, wherein said nanostructures comprise 180° of effective polarization separation in a space of less than about 0.2 mm.

14. The radiation polarizer of claim 1, wherein said nanostructures comprise an acceptance angle of up to about +/−20°.

15. The radiation polarizer of claim 1, wherein each nanostructure of said layer of nanostructures comprises at least one selected from the group consisting of a rectangle, a trapezoid, a semicircle, an oval, a convex hull, a stepped set, and a pillar.

16. The radiation polarizer of claim 1, further comprising a multilayer anti-reflective coating communicatively coupled to at least one of said at least two nanostructures.

17. A method for providing at least one of radiation polarizer and beam control, comprising:
   communicatively coupling at least one anti-reflection coating layer to a substrate;
   communicatively coupling at least two nanostructures to at least one of the at least one anti-reflection coating layer thereby forming a nanostructure layer, said at least two nanostructures each including a metallic and dielectric combination, said metallic and dielectric of said combination being located adjacent each other, said metallic having a short surface and a long surface, said dielectric extending only partially along said long surface of said metallic;
   coupling the at least two nanostructures of said nanostructure layer to provide a pass wavelength in the range of about 250 nm to 30 microns; and
   allowing for an examining of radiation having a wavelength in a range of about 250 nm to less than about a microwave wavelength, by allowing for a passing of the radiation through said nanostructure layer and by allowing for a reflecting of the radiation from said coupling of said nanostructure layer.

18. The method of claim 17, further comprising providing at least one protective layer atop the at least one anti-reflective coating, and the nanostructure layer.

19. The method of claim 17, further comprising providing at least one protective layer beneath the at least one anti-reflective coating, and the nanostructure layer.

20. The method of claim 17, further comprising orienting each of the nanostructures substantially parallel to each other of the nanostructures.

21. The method of claim 17, further comprising separating at least one of the at least two nanostructures from the substrate by at least one etch stop layer.

22. The method of claim 17, further comprising separating a first of the nanostructures from a second of said nanostructures by at least one selected from the group consisting of at least one spacer air, vacuum, and a dielectric material.

23. The method of claim 17, further comprising composing said metallic of each nanostructure of the layer of nanostructures to a height in a range of about 50 nm to about 250 nm.

24. The method of claim 17, further comprising composing said metallic of each nanostructure of the layer of nanostructures to a width in a range of about 30 nm.

25. The method of claim 17, further comprising composing the nanostructures to an acceptance angle of up to about +/−20°.

26. A radiation controller, comprising:
means for communicatively coupling at least one anti-reflection coating layer to a substrate;
means for communicatively coupling at least two nanostructures to at least one of the at least one anti-reflection coating layer thereby forming a nanostructure layer, wherein at least one of the at least two nanostructures is comprised of a combination of a metallic element and a dielectric element, each metallic element having a height in a range of about 50 nm to about 250 nm, and a width in a range of about 30 nm, wherein said metallic and dielectric of said combination being located adjacent each other, said metallic having a short surface and a long surface, said dielectric extending only partially along said long surface of said metallic;
means to provide a pass wavelength in the range of about 250 nm to less than about a microwave wavelength;
means for providing substantially between said substrate and said nanostructure layer a plurality of dielectrics, said plurality of dielectrics having a refractive index greater than one; and,
means for allowing for examination of radiation having a wavelength in a range of about 250 nm to 30 microns.

27. The controller of claim 26, further comprising means for orienting each of the nanostructures parallel to each other of the nanostructures.

28. The controller of claim 26, further comprising means for separating at least one of the at least two nanostructures from the substrate by at least one etch stop layer.

29. The controller of claim 26, further comprising means for separating a first of the nanostructures from a second of said nanostructures by at least one selected from the group consisting of air, vacuum and a dielectric material.

30. A monolithic optical device, comprising:
optical radiation;
an optical radiation processor, comprising:
a substrate;
at least one anti-reflection coating layer communicatively coupled to said substrate;
at least two nanostructures communicatively coupled to said at least one anti-reflection coating layer forming a nanostructure layer, wherein at least one of said at least two nanostructures comprises a combination of a metallic and a dielectric, each metallic having a width in the range of about 30 nm, wherein said metallic and dielectric being located adjacent each other, said metallic having a short surface and a long surface, said dielectric extending only partially along said long surface of said metallic; and
wherein said nanostructure layer polarizes the radiation, wherein the radiation has a wavelength in a range of about 250 nm to 30 microns.

* * * * *